US005292351A

United States Patent [19]

DeRosa et al.

[11] Patent Number: 5,292,351

[45] Date of Patent: Mar. 8, 1994

[54] COMPOSITION OF MATTER FOR ALOYL AND AROYL UREAS AS NITRIC OXIDE REDUCING AGENTS IN DIESEL EMISSIONS

[75] Inventors: Thomas F. DeRosa, Passaic, N.J.; Rodney Lu-Dai Sung, Fishkill; Benjamin J. Kaufman, Hopewell Jct., both of N.Y.

[73] Assignee: Texaco Inc., White Plains, N.Y.

[21] Appl. No.: 976,640

[22] Filed: Nov. 16, 1992

[51] Int. Cl.[5] .......................... C10L 1/22; C01B 21/00

[52] U.S. Cl. ...................................... 44/417; 423/212; 423/235

[58] Field of Search ................... 44/417; 423/212, 235

[56] References Cited

U.S. PATENT DOCUMENTS

| | | | |
|---|---|---|---|
| 2,813,783 | 11/1957 | Gleim | 44/417 |
| 3,894,141 | 7/1975 | Moser | 423/235 |
| 4,119,702 | 10/1978 | Azuhata et al. | 423/351 |
| 4,325,924 | 4/1982 | Grand et al. | 423/235 |
| 4,405,587 | 9/1983 | McGill et al. | 423/235 |
| 4,448,899 | 5/1984 | Hass | 423/235 |
| 4,761,270 | 8/1988 | Turchan | 423/235 |
| 4,770,863 | 9/1988 | Epperly et al. | 423/235 |
| 4,927,612 | 5/1990 | Bowers | 423/235 |
| 5,017,347 | 5/1991 | Epperly et al. | 423/235 |
| 5,234,477 | 8/1993 | Gwyn | 423/235 |

FOREIGN PATENT DOCUMENTS 0117282 7/1983 Japan .

*Primary Examiner*—Jerry D. Johnson

*Attorney, Agent, or Firm*—James J. O'Loughlin; Vincent A. Mallare

[57] ABSTRACT

A composition of matter comprising:

a) an aloyl urea represented by the formula

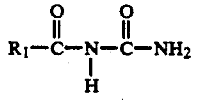

where $R_1$ is hydrogen or a ($C_1$-$C_{50}$) linear or branched aliphatic, alkenyl, alkynyl, or aryl hydrocarbon; and b) an aroyl urea represented by the formula

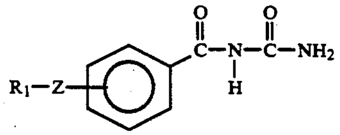

where $R_1$ is a ($C_1$-$C_{50}$) linear or branched aliphatic, alkenyl, alkynyl or aryl hydrocarbon; and Z is a heteroatom selected from the group consisting of Group IVa, Group Va and Group VIa materials of the periodic table.

7 Claims, No Drawings

COMPOSITION OF MATTER FOR ALOYL AND AROYL UREAS AS NITRIC OXIDE REDUCING AGENTS IN DIESEL EMISSIONS

BACKGROUND OF THE INVENTION

This invention relates to a composition of matter used in a chemical method of decreasing nitric oxide, NOx, levels. The chemicals utilized by this composition of matter patent are reducing agents. When these reducing agents come in contact with NOx, the latter is reduced to non-toxic or environmentally friendly substances. The chemical method utilized in this composition of matter is designed to both enhance the overall thermal stability of the reducing agent and to foster its dissolution in diesel fuel.

Nitrogen oxides are the oxidation products of elemental nitrogen, organic, or inorganic nitrogen and oxygen at elevated temperatures. Nitrogen oxides include nitric oxide, NO; nitrogen dioxide, $NO_2$; nitrogen trioxide, $NO_3$; dinitrogen trioxide, $N_2O_3$; tetranitrogen pentaoxide, $N_4O_5$; tetranitrogenhexaoxide, $N_4O_6$; nitrous oxide, $N_2O$; and the like. Elevated temperatures required to prepare these oxidation products are routinely obtained in internal combustion engines utilizing gasoline, diesel, or aviation fuel.

There are cogent ecological and environmental reasons to reduce or ideally eliminate NOx as an internal combustion oxidation product. Once produced, NOx is directly responsible for acid rain and photochemical smog. Moreover, chronic exposure to NOx has been directly linked with restricted pulmonary compliance in non-smoking healthy males; acute respiratory disease among children living in "high exposure" towns in Czechoslovakia; and a key irritant cited for the high incidence of chronic bronchitis among Japanese postal workers servicing urban centers as outlined in Medical and Biologic Effects of Environmental Pollutants by the National Academy of Sciences, 1977.

DISCLOSURE STATEMENT

Numerous chemical and physical methods have been suggested to reduce or eliminate NOx. Certain proposed techniques involve a great deal of capital outlay and require major consumption of additives, scrubbers, etc. For example, U.S. Pat. No. 3,894,141 proposes a reaction with liquid hydrocarbons; U.S. Pat. No. 4,405,587 proposes high temperature burning with a hydrocarbon; U.S. Pat. No. 4,448,899 proposes reacting with an iron chelate; U.S. Pat. No. 3,262,751 reacts NOx with a conjugated diolefin. Other methods utilize reactions with nitriles (U.S. Pat. No. 4,080,425), organic N-compounds amines or amides (DE No.33 24668) or pyridine (J57190638). Application of these reactions imposes organic pollutant disposal problems along with the attendant problems of toxicity and malodorous environments. In addition, they require the presence of oxygen and are relatively expensive. Other systems are based on urea reactions. For example U.S. Pat. No. 4,119,702 uses a combination of urea and an oxidizing agent which decomposes it e.g., ozone, nitric acid, inter alia; U.S. Pat. No. 4,325,924 utilizes urea in a high temperature reducing atmosphere; and U.S. Pat. No. 3,900,554 utilizes a combination of ammonia and oxygen to react with nitric oxide. All of these methods must deal with the problem of the odor of ammonia and its disposal. All require oxygen and other oxidizing agents. These methods also suffer from the drawback environments which make them difficult to use in mobile vehicles or smaller stationary devices.

Back et al, Can J.Chem. 46, 531 (1968), discusses the effect of NOx on the photolysis of isocyanic acid, HNCO, the decomposition product of cyanuric acid. Increased nitrogen levels in the presence of nitric oxide were observed utilizing a medium pressure mercury lamp for HNCO photolysis. Despite several remaining uncertainties, it was clear that nitric oxide levels were reduced when contact with isocyanic acid or its dissociation products was effected. A readily available of isocyanic acid is via the thermal decomposition or unzipping of the corresponding trimer, cyanuric acid,$(HNCO)_3$.

Others disclosures, especially as noted by Epperly et al in U.S. Pat. Nos. 4,770,863 and 5,017,347 and Bowers in U.S. Pat. No. 4,927,612 report the use of ureas as another source of isocyanic acid. In addition, Prebhakaran et al, Indian J. Chem. Sect. B. 30(1), 1072-3 (1991) reports a chemical method utilizing a triarylphosphite as a catalyst for converting ureas into the corresponding aroyl or aloyl ureas in moderately high yields. It may be inferred, however, that methods utilizing urea as a reagent or co-reagent have limited applicability in non-stationary power generators because of their very limited solubility in non-polar solvents, most notably, diesel fuel.

Thus, an object of the present invention is to provide a chemical preparation of isocyanic acid from a material that is a diesel fuel-soluble precursor for non-stationary power generators.

SUMMARY OF THE INVENTION

The present invention provides a composition of matter comprising:

a) an aloyl urea represented by the formula

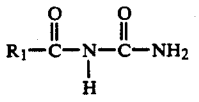

where $R_1$ is hydrogen or a $(C_1-C_{50})$ linear or branched aliphatic, alkenyl, alkynyl, or aryl hydrocarbon; and b) an aroyl urea represented by the formula

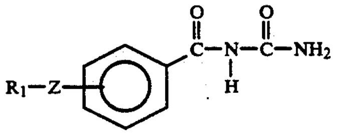

where $R_1$ is a $(C_1-C_{50})$ linear or branched aliphatic, alkenyl, alkynyl or aryl hydrocarbon; and Z is a heteroatom selected from the group consisting of Group IVa, Group Va and Group VIa materials of the periodic table.

DETAILED DISCUSSION OF THE INVENTION

The present invention provides a composition of matter comprising substituted aroyl (I) or aloyl ureas (II) as represented by the following structures:

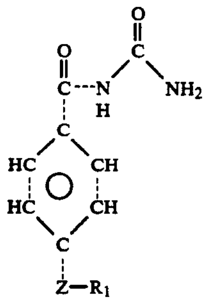

(I)
Aroyl Urea

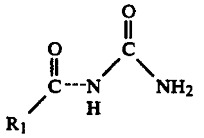

(II)
Aloyl Urea where $R_1$ is hydrogen or a ($C_1$–$C_{50}$) linear or branched aliphatic, alkenyl, alkynyl, or aryl group containing one or more sites of unsaturation and any chemically acceptable permutation of the aforementioned hydrocarbons; and Z is one or more heteroatoms selected from the group consisting of Group IVa, Group Va and Group VIa materials of the periodic table of the elements.

In the above structures of (I) and (II), $R_1$ may be a mixture of ($C_9$–$C_{19}$) aliphatic hydrocarbons, a mixture of ($C_{17}$–$C_{35}$) aliphatic hydrocarbons, a mixture of ($C_{12}$–$C_{25}$) and ($C_{17}$–$C_{35}$) aliphatic hydrocarbons, a ($C_8$–$C_{17}$) aliphatic hydrocarbon or a ($C_9$–$H_{19}$) aliphatic hydrocarbon.

Upon thermal decomposition of either aroyl or aloyl urea, isocyanic acid, (III), is generated in addition to the corresponding amide, (IV). This is illustrated below in Equation (Eq.) 1 using aroyl urea and where Z and $R_1$ are as defined above as well as in Equation (Eq.) 8 below.

Eq. 1.

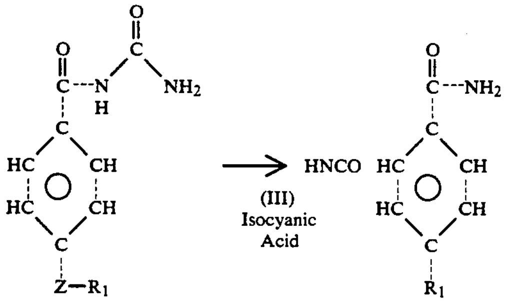

(III)
Isocyanic
Acid (IV)
Arylamide

In addition, the present composition of matter invention provides a method of solubilizing aroyl or aloyl ureas in diesel fuel that upon their thermal decomposition generate isocyanic acid, (III), an effective nitric oxide reducing agent.

This composition of matter application is targeted as a diesel fuel additive. The method entails solubilizing urea in diesel fuel so that upon thermal decomposition during the combustion event, an active nitric oxide reducing agent, isocyanic acid, is generated. Empirically we have discovered that optimum diesel fuel solubility is achieved using aroyl ureas or aloyl ureas.

The chemical underpinning of this invention is generating isocyanic acid, HNCO, to reduce nitrogen oxide (NOx) emissions to environmentally friendly materials as depicted below in Equation (Eq.) 2. Isocyanic acid is generated quantatively by thermally decomposing cyanuric acid as shown below in Equation (Eq.) 3.

$$HNCO + NOx \longrightarrow N_2 + CO_2 + H_2O \quad \text{Eq. 2.}$$

Isocyanic Acid — Nitrogen Oxides from Stationary Source

However, cyanuric acid technology has very limited applicability to non-stationary NOx power plants because of its insolubility in diesel fuel. Derivatizing cyanuric acid, (IV), to enhance its diesel fuel solubility proportionately diminishes its latent isocyanic acid capacity as illustrated below in Equations (Eqs.) 4, 5 and 6.

Eq. 3.

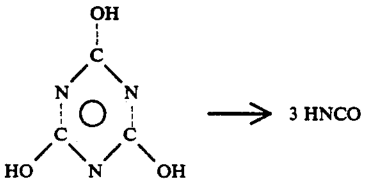

(IV)
Cyanuric Acid

Eq. 4.

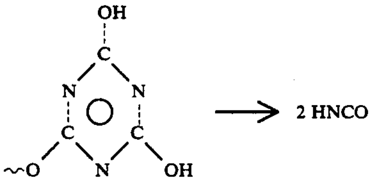

Eq. 5.

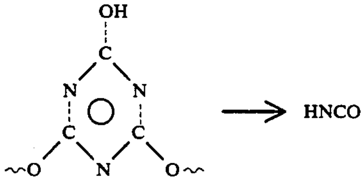

Eq. 6.

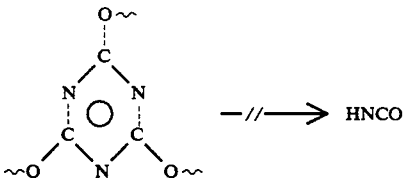

Thus, as shown above, the thrust of the present invention is both the use of urea (V) and, as a cost effective source of isocyanic acid as illustrated below in Equation (Eq.) 7; and a method of solubilizing the same to ensure high diesel fuel solubility.

Eq. 7.

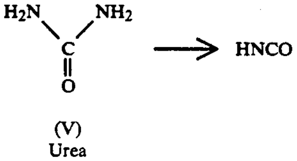

(V)
Urea

According to the present invention, these goals are achieved by utilizing urea by converting it into the corresponding aroyl (I) or aloyl urea (II). the chemical method of converting urea into the corresponding aroyl or aloyl urea entails heating urea together with a carboxylic acid, (VI), in the presence of a catalytic amount of triphenylphosphite. This reaction is illustrated below in Equation (EQ.) 8.

Eq. 8.

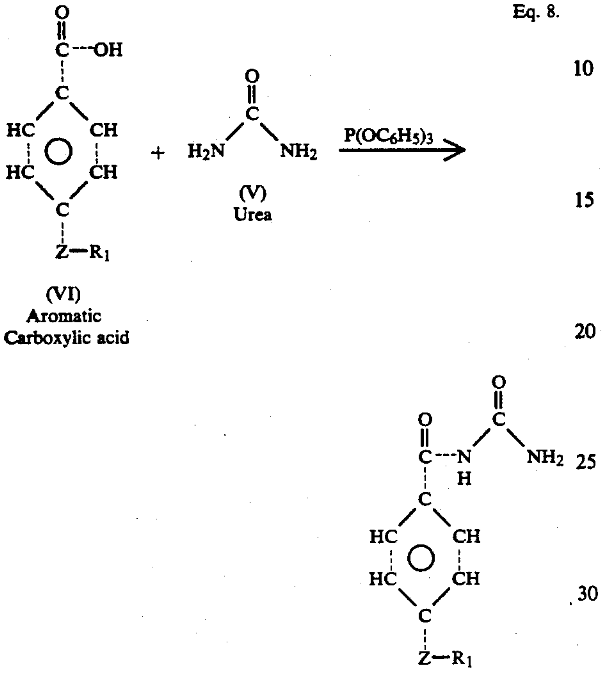

(VI) Aromatic Carboxylic acid (V) Urea (I) Aroyl Urea

Thermal decomposition of aroyl or aloyl ureas generates isocyanic acid in high yield as illustrated above in Equation (Eq.) 1.

In order to further illustrate the present invention and its advantages, the following Examples are provided.

EXAMPLE 1

Preparation of p-(n-octyloxy)benzoylurea

A 500 ml 3-neck round bottom flask containing a magnetic stirrer, thermometer, and a reflux condensor with a gas egress tube for a nitrogen blanket is charged with a one part apiece of p-(n-octyloxy)benzoic acid and urea dissolved in 15 parts N-methylpyrrolidone containing 0.01wt percent triphenylphosphite. The mixture is heated to 120 deg C. for approximately 2-5 hours and then cooled. The addition of a copious amount of 3M aqueous sodium hydroxide to a cooled solution precipitates the product, which is isolated by filtration. Infrared absorbance at 3250 cm-1 (urea N—H stretching) and at 1705 cm-1 and 1640 cm-1 (amide and urea C═O stretching, respectively) in addition to the conspicuous absence of any absorbance at 3490 cm-1 (acid O—H stretching) confirm the chemical transformation.

EXAMPLE 2

Preparation of Benzoylurea

In this Example, benzoic acid was substituted for the p-(n-octyloxy) benzoic acid in the aforementioned Example 1 to provide the product of the present Example.

EXAMPLE 3

Preparation of p-(Nonoxy)benzoylurea

In this Example, p-(Nonoxy)benzoic acid was substituted for the p-(n-octyloxy) benzoic acid in the aforementioned Example 1 to provide the product of the present Example.

EXAMPLE 4

Preparation of Stearoylurea

In this Example, stearic acid was substituted for the p-(n-octyooxy) benzoic acid in the aforementioned Example 1 to provide the product of the present Example.

EXAMPLE 5

Preparation of Cocoylurea

In this Example, cocoyl acid was substituted for the p-(n-octyloxy) benzoic acid in the aforementioned Example 1 to provide the product of the present Example.

EXAMPLE 6

Preparation of Lauoylurea

In this Example, lauylic acid was substituted for the p-(n-octyloxy) benzoic acid in the aforementioned Example 1 to provide the product of the present Example.

EXAMPLE 7

Preparation of Talloylurea

In this Example, tallowic acid was substituted for the p-(n-octyloxy) benzoic acid in the aforementioned Example 1 to provide the product of the present Example.

The materials synthesized according to the present invention were structurally and physically evaluated. It was fingerprinted by examining infrared absorbance between 3300 cm-1 and 3200 cm-1 for urea N—H stretching and between 1710 cm-1 to 1630 cm-1 for amide and urea C═O stretching, respectively. Results of diesel fuel solubility and decomposition properties are summarized below in Table I.

TABLE I

DIESEL FUEL SOLUBILITY AND CORRESPONDING NITROGEN AND ISOCYANIC ACID CONTENT FOR ALOYL AND AROYL UREAS

| Material** | Diesel Fuel Solubility at Turbidity Point (wt %) | Nitrogen Content (wt %) | Theortical Isocyanic Acid Content (wt %) | Temperature Isocyanic Acid Generated (deg C)*1 |
|---|---|---|---|---|
| Unmodified urea | >.1 | 46.67 | 71.67 | 160–180 |
| N-(C9–C14)-urea | <15 | 10.94 | 16.80 | 310–350 |
| Benzoylurea | >.1 | 17.07 | 19.51 | 305–350 |
| p-octyloxybenzoylurea | <20 | 16.67 | 19.05 | 310–355 |
| p-nonyloxybenzoylurea | <20 | 14.00 | 16.00 | 325–360 |
| Stearoylurea | ~10 | 8.59 | 9.82 | 310–350 |
| Cocoylurea | <20 | — | — | 290–340 |
| Lauoylurea | <20 | 11.02 | 12.60 | 305–350 |
| Talloylurea | <15 | — | — | 300–340 |

**Other substituted ureas are provided as a reference.
*1 Heating rate of 200 deg C-min-1 under nitrogen
*2 NOx-reducing properties have been correlated with diesel engine test data.
From the results provided above in Table I, it is clear that enhanced diesel solubility and thermal stability of this additive result when this unique experimental approach is utilized.

From the results provided above in Table I, it is clear that enhanced diesel solubility and thermal stability of this additive result when this unique experimental approach is utilized.

We claim:

1. A composition of matter comprising:

a) an aloyl urea represented by the formula

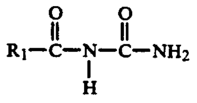

where $R_1$ is hydrogen or a ($C_1$–$C_{50}$) linear or branched aliphatic, alkenyl, alkynyl, or aryl hydrocarbon; and b) an aroyl urea represented by the formula

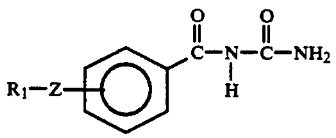

where $R_1$ is a ($C_1$–$C_{50}$) linear or branched aliphatic, alkenyl, alkynyl or aryl hydrocarbon; and Z is a heteroatom selected from the group consisting of Group IVa, Group Va and Group VIa materials of the periodic table.

2. A composition of matter according to claim 1, wherein $R_1$ is a ($C_9H_{19}$) aliphatic hydrocarbon.

3. A composition of matter according to claim 1, wherein $R_1$ is a ($C_{17}H_{35}$) aliphatic hydrocarbon.

4. A composition of matter according to claim 1, wherein $R_1$ is a mixture of ($C_{12}H_{25}$) and ($C_{17}C_{35}$) aliphatic hydrocarbons.

5. A composition of matter according to claim 1, wherein $R_1$ is a ($C_8H_{17}$) aliphatic hydrocarbon.

6. A composition of matter according to claim 1, wherein $R_1$ is a ($C_9H_{19}$) aliphatic hydrocarbon.

7. A composition of matter according to claim 1, wherein the heteroatom is oxygen.

* * * * *